US009207082B2

(12) United States Patent
Qiu et al.

(10) Patent No.: US 9,207,082 B2
(45) Date of Patent: Dec. 8, 2015

(54) FIBER RESONATOR GYROSCOPE WITH LOW ROUND TRIP LOSS AND HIGH OUTPUT POWER

(75) Inventors: Tiequn Qiu, Glendale, AZ (US); Glen A. Sanders, Scottsdale, AZ (US); Lee K. Strandjord, Tonka Bay, MN (US)

(73) Assignee: Honeywell International Inc., Morristown, NJ (US)

( * ) Notice: Subject to any disclaimer, the term of this patent is extended or adjusted under 35 U.S.C. 154(b) by 772 days.

(21) Appl. No.: 13/586,055

(22) Filed: Aug. 15, 2012

(65) Prior Publication Data

US 2015/0260520 A1   Sep. 17, 2015

(51) Int. Cl.
*G01C 19/72* (2006.01)
(52) U.S. Cl.
CPC ............ *G01C 19/727* (2013.01); *G01C 19/721* (2013.01); *G01C 19/72* (2013.01)
(58) Field of Classification Search
CPC ...... G01C 19/64; G01C 19/66; G01C 19/721; G01C 19/727
See application file for complete search history.

(56) References Cited

U.S. PATENT DOCUMENTS

| 4,705,398 | A | 11/1987 | Lim et al. |
|---|---|---|---|
| 5,123,027 | A | 6/1992 | Lawrence |
| 5,136,668 | A | 8/1992 | Malvern |
| 5,327,214 | A * | 7/1994 | Asami ........................... 356/464 |
| 5,351,252 | A * | 9/1994 | Toyama et al. ........... 372/29.021 |
| 5,495,335 | A | 2/1996 | Cote |
| 5,627,644 | A * | 5/1997 | Sanders ......................... 356/464 |
| 7,385,177 | B2 | 6/2008 | Steinberg et al. |
| 7,486,401 | B2 | 2/2009 | Sanders |
| 2004/0202222 | A1 | 10/2004 | Pocholle et al. |
| 2007/0223001 | A1* | 9/2007 | Feugnet et al. ................ 356/460 |
| 2009/0046294 | A1* | 2/2009 | Kaplan ......................... 356/460 |
| 2010/0257950 | A1 | 10/2010 | Yang |
| 2011/0019198 | A1* | 1/2011 | Sanders et al. ................. 356/461 |

OTHER PUBLICATIONS

Leeuwen et al., "Low Noise High Power Ultra-Stable Diode Pumped Er—Yb Phosphate Glass Laser", "Proc. of SPIE vol. 6975", Apr. 3, 2008, pp. 1-9.

* cited by examiner

*Primary Examiner* — Michael P Lapage
(74) *Attorney, Agent, or Firm* — Fogg & Powers LLC

(57) ABSTRACT

One embodiment is directed to a resonator fiber optic gyroscope (RFOG). The optical fiber resonator includes an optical fiber, one or more optical filters that suppresses the noise light in the resonator, one or more variable optical attenuators (VOAs) that can adjust the loss of the resonator with fast response, and one or more optical gain elements that provide amplification of light to offset part of the losses of the resonator. The RFOG also includes one or more pump lasers to produce one or more pump beams for the gain elements in the resonator and control electronics configured to control the one or more pump lasers and the one or more variable optical attenuators, such that the round-trip loss of the resonator is a substantially constant, positive value.

16 Claims, 4 Drawing Sheets

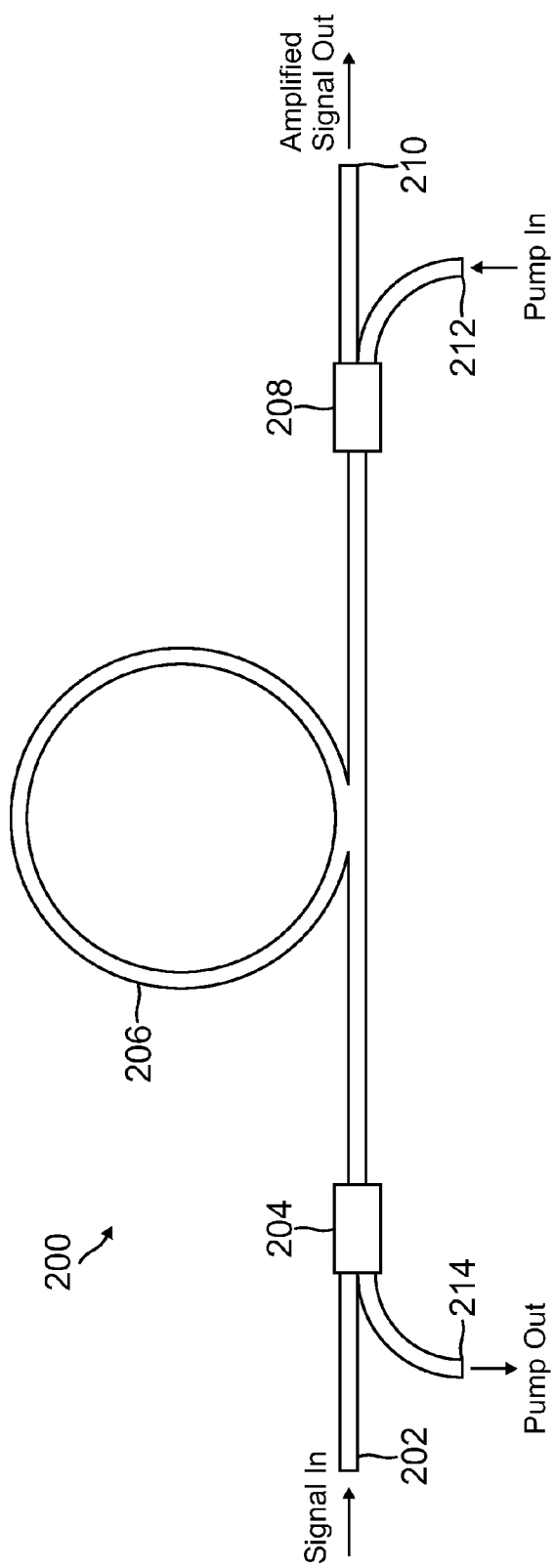
FIG. 2
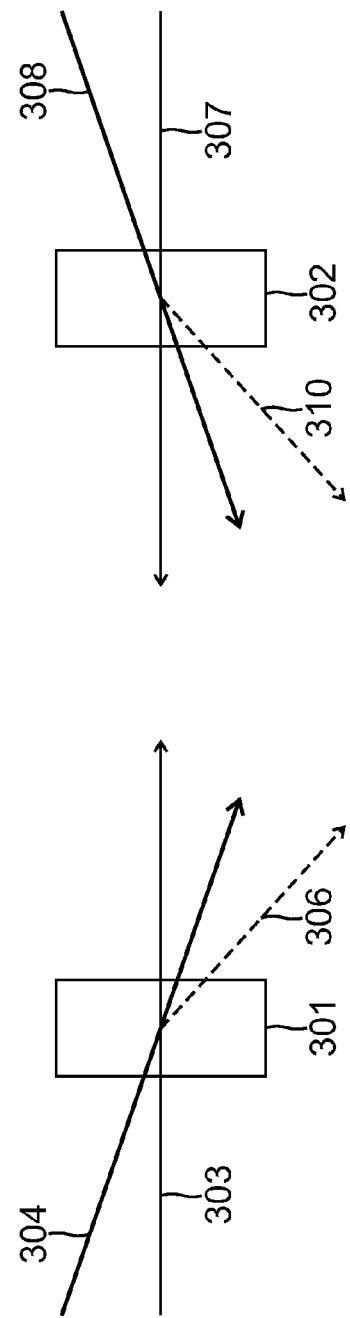
FIG. 3A
FIG. 3B

FIBER RESONATOR GYROSCOPE WITH LOW ROUND TRIP LOSS AND HIGH OUTPUT POWER

BACKGROUND

There is a need for low cost, high performance gyroscopes for navigation systems, precision point systems, and guidance systems. The resonator fiber optic gyroscope (RFOG) is being developed as a new technology using optical fibers, including hollow core fibers) to form a sensing loop. To improve the sensitivity of the gyroscope, longer fiber length may be used to reduce the resonance linewidth, which increases the cavity round trip loss. Polarization and spatial mode filters may also be added to the resonator to prevent unwanted polarization and high order spatial modes from causing bias instability in rotation rate measurements. In addition, it is desirable to output as much optical power as possible to detectors to reduce the shot noise. This requires a large portion of the light being coupled out of the resonator (i.e., high coupling losses for the resonator). All these factors add extra losses to the resonator, making it difficult to achieve the desired gyro performance due to reduced resonator finesse, or significantly increasing the cost for adopting ultra-low-loss components. Component aging is another factor that can affect the cavity round trip loss over time, causing gradual degradation of performance. So it is desirable to find a way for precisely controlling the resonator round trip loss while coupling high power to detectors.

SUMMARY

One embodiment is directed to a resonator fiber optic gyroscope (RFOG). The RFOG includes one or more light sources to produce a first light and a second light and an optical fiber resonator. The optical fiber resonator includes an optical fiber having a first end and a second end; a first input/output coupling element to couple at least a portion of the first light into the optical fiber as clockwise propagating light; a second input/output coupling element to couple the second light into the optical fiber as counter-clockwise propagating light; one or more optical filters that suppresses the noise light in the resonator; one or more variable optical attenuators (VOAs) that can adjust the loss of the resonator with fast response; and one or more optical gain elements that provide amplification of light to offset part of the losses of the resonator. The RFOG also includes a first detector configured to sense the portion of the counter-clockwise propagating light and provide a signal based thereon to resonance tracking electronics, and a second detector configured to sense the portion of the clockwise propagating light and provide a signal based thereon to the resonance tracking electronics. The resonance tracking electronics are configured to determine a rotation rate of the optical fiber resonator based on the signals from the first and second detector. The RFOG also includes one or more pump lasers to produce one or more pump beams for the gain elements in the resonator and control electronics configured to control the one or more pump lasers and the one or more variable optical attenuators, such that the round-trip loss of the resonator is a substantially constant, positive value.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 2 is a diagram of an example fiber amplifier that can be used as a gain element in the system of FIG. 1.

FIGS. 3A and 3B are diagrams of example optical parametric amplifiers that can be used as gain elements in the system of FIG. 1.

Figure 1:
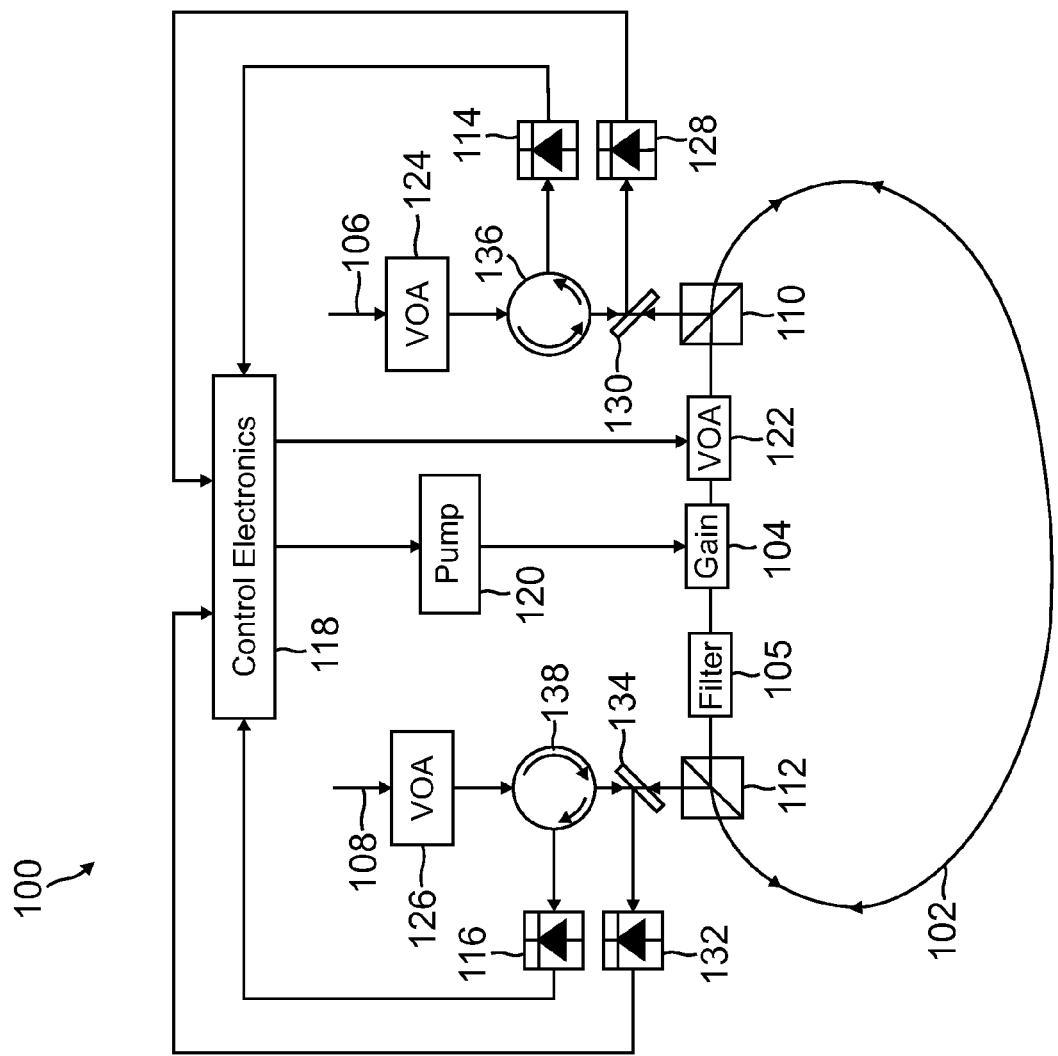
FIG. 1 is a block diagram of an example system including an optical fiber resonator having one or more gain elements therein for use in a gyroscope.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

As used herein, the terms "light source" and "laser" are interchangeable. Similarly, as used herein, the terms "laser beam" and "light" are interchangeable.

The solutions to provide a low cost, high performance gyroscope discussed above can lead to concerns that the performance of the gyroscope may be limited by the total component losses in the resonator. The subject matter described herein can address these concerns by providing gain to offset the losses incurred by other optical elements in the resonator. The subject matter described herein can be used to make the effective round-trip loss close to zero and positive. Positive loss means the provided gain is not high enough to over compensate the loss. As often used herein, a round-trip loss of the resonator that is a substantially constant positive value has the same meaning as a round-trip transmission coefficient that is less than 100%. In an example, the systems described herein maintain the round-trip transmission coefficient at greater than 90% which equates to a round-trip loss (in both the CW and CCW directions) of less than 10%. Adding controlled gain in the resonator to offset the loss can significantly relax intra-cavity component loss specifications and input laser power requirements. The later is desirable for low cost as well as for low power dissipation in a compact gyro form factor. In addition, this invention may be implemented in a way that significantly increases the optical power at the resonator detector so that shot noise induced angle random walk (ARW) is reduced.

FIG. 1 is a block diagram of an example system 100 including an optical fiber ring resonator including an optical fiber 102 and one or more gain elements 104 therein for use in a gyroscope. A gyroscope using an optical fiber ring resonator is often referred to as a resonator fiber optic gyroscope (RFOG). The one or more gain elements 104 amplify the light propagating in the optical fiber ring resonator (also referred to herein as simply "fiber resonator" or "resonator"). This amplification can be used to offset part of the losses of other optical elements in the resonator.

In an example, the optical fiber resonator comprises a hollow core optical fiber 102. The optical fiber resonator is configured such that a portion of the light exiting one end of the optical fiber 102 is directed back into the other end of the optical fiber 102. As such light in the resonator can circulate multiple times through the optical fiber 102.

Light for propagating in the resonator is generated by one or more light sources, such as one or more lasers. The one or more light sources generate a first light 106 for propagating in a clockwise direction through the resonator and a second light 108 for propagating in a counter-clockwise direction through the resonator. Accordingly, the resonator includes the optical fiber 102, a first input/output coupling element 110, a second input/output coupling element 112, as well as the one or more gain elements 104. In this example, the resonator also includes a filter 105 and a variable optical attenuator (VOA) 122 as discussed below.

After passing through one or more optical elements, described below, at least a portion of the first light 106 is coupled into the resonator in a clockwise direction by a first input/output coupling element 110. Similarly, after passing through one or more optical elements, described below, at least a portion of the second light 108 is coupled into the resonator in a counter-clockwise direction by a second input/output coupling element 112.

In an example, the input/output coupling elements 110, 112 comprise partially reflective mirrors. In the example shown in FIG. 1, the first input/output coupling element 110 is configured to reflect at least a portion of the first light 106 into a first end of the optical fiber 102 as clockwise (CW) propagating light. That is, the first light 106 and the first input/output coupling element 110 are oriented such that at least a portion of the first light 106 is incident upon a reflective surface of the first input/output coupler 110 and reflected off of the reflective surface into the first end of the optical fiber 102. In an example, the first input/output coupling element 110 is oriented such that the first light 106 is reflected into the optical fiber 102 at about a 90 degree angle. Similarly, the second input/output coupling element 112 is configured to reflect at least a portion of the second light 108 into a second end of the optical fiber 102 as counter-clockwise (CCW) propagating light. That is, the second light 108, and the second input/output coupling element 112 are oriented such that at least a portion of the second light 108 is incident upon a reflective surface of the second input/output coupler 112 and is reflected off of the reflective surface into the second end of the optical fiber 102. In an example, the second input/output coupling element 112 is oriented such that the second light 108 is reflected into the resonator at about a 90 degree angle. In this way, the first light 106 and the second light 108 are sent into the optical fiber 102 to propagate in opposite directions therethrough.

In the example shown in FIG. 1, the optical fiber 102 is oriented with the first end facing and aligned with the second end, such that the CW propagating light exiting the second end of the optical fiber 102 can propagate in a straight line to re-enter the first end of the optical fiber 102. In this orientation, the CCW propagating light exiting the first end can also propagate in a straight line to re-enter the first end of the optical fiber 102.

In this example, the first and second input/output coupling elements 110, 112 are disposed within the paths of the CW propagating light and the CCW propagating light between the first end and the second end of the resonator. The first input/output coupling element 110 is configured to transmit the CW propagating light that has exited the second end of the resonator therethrough such that this CW propagating light can re-enter the first end of the resonator. Likewise, the second input/output coupling element 112 is configured to transmit the CCW propagating light that has exited the first end of the resonator therethrough such that this CCW propagating light can re-enter the second end of the resonator. In this way, the CW propagating light and the CCW propagating light can circulate multiple times through the resonator.

The first and second input/output coupling elements 110, 112 are also configured to direct a portion of the light propagating through the resonator out of the resonator for sensing. The first input/output coupling element 110 is configured to reflect a portion of the CCW propagating light out of the resonator and the second input/output coupling element 112 is configured to reflect a portion of the CW propagating light out of the resonator. By selecting the reflectivity of the surfaces of the first and second input/output coupling elements 110, 112, a portion of the CW and the CCW propagating light can be reflected out of the resonator and the remaining portions of the CW and CCW propagating light can be transmitted through the first and second input/output coupling elements 110, 112 to keep circulating in the resonator.

The portion of the CW and CCW propagating light that exits the resonator is directed to a first and second detector 114, 116 respectively. The first detector 114 senses the portion of the CCW propagating light from the first input/output coupling element 110 and generates an electrical signal corresponding to the intensity of the CCW propagating light. Similarly, the second detector 116 senses the portion of the CW propagating light from the second input/output coupling element 112 and generates an electrical signal corresponding to the intensity of the CW propagating light. The signals from the first and second detectors 114, 116 are provided to resonance tracking electronics for determining a rotation of the resonator based on the signals.

The system 100 includes a first and second circulator 136, 138 to direct the first and second light 106, 108 toward the resonator and to direct the portion of the CCW and CW propagating light that has exited from the resonator to their respective detectors 114, 116. The first circulator 136 is configured to receive the first light 106 at a first port and direct the first light 106 to a second port where it can propagate to the first input/output coupling element 110. At the second port, the first circulator 136 also receives the portion of the CCW propagating light that is coupled out of the resonator. This light is directed to a third port where the light can propagate to the first detector 114. Similarly, the second circulator 138 is configured to receive the second light 108 at a first port and direct the second light 108 to a second port where it can propagate to the second input/output coupling element 112. At the second port, the second circulator 138 also receives the portion of the CW propagating light that is coupled out of the resonator. This light is directed to a third port where the light can propagate to the second detector 116.

In an example, the first light 106 and second light 108 pass through a second variable optical attenuator (VOA) 124 and a third VOA 126 respectively. The second and third VOAs 124, 126 adaptively attenuate the first and second light 106, 108 to reduce the intensity variation thereof and such that the intensity of the CW and CCW light is substantially the same. The second and third VOAs 124,126 are controlled by control electronics 118. The control electronics 118 adaptively adjust the attenuation of the second and third VOAs 124,126 based on sensing of the first and second light 106, 108. In particular, the second VOA 126 is controlled to adaptively attenuate the first light 106 based on signals from a third detector 128 that is configured to sense the first light 106. A first beam splitter 130 disposed in the path of the first light 106 is configured to reflect a portion of the first light 106 to the third detector 128. The third detector 128 generates an electrical signal based on the first light 106 and sends the electrical signal to the control electronics 118. Similarly, the third VOA 126 is controlled to adaptive attenuate the second light 108 based on signals from a fourth detector 132 that is configured to sense the second light 108. A second beam splitter 134 disposed in the path of the second light 108 is configured to reflect a portion of the second light 108 to the fourth detector 132. The fourth detector 132 generates an electrical signal based on the second light 108 and sends the electrical signal to the control electronics 118. In this way, the intensity variation of the first and second light 106, 108 can be reduced to provide uniform intensity light to the resonator. The intensity of the CW and CCW light is adjusted, such that the intensity of the CW and CCW light is substantially the same.

As mentioned above, the system 100 includes one or more gain elements 104 to amplify the signals propagating through the resonator. The one or more gain elements 104 are disposed in the paths of the CW and CCW propagating light and are configured to amplify the CW and CCW propagating light. The one or more gain elements 104 are configured such that lasing does not occur in the resonator. To ensure that lasing does not occur, the one or more gain elements 104 are configured such that the round-trip transmission coefficient of the CW and CCW propagating light through the resonator is less than one.

In an example, the amplification provided by the one or more gain elements 104 is controlled by the control electronics 118. The control (e.g., servo) electronics 118 receive signals from the first and second detectors 114, 116 as an indication of the intensity of the CW and CCW propagating light output from the resonator. In addition, signals from the third and fourth detector 128, 132 are fed to the control electronics 118 to monitor the CW and CCW input light intensity 106, 108 respectively as discussed above. Based on these signals, the control electronics 118 control the input light intensity by the variable optical attenuators (VOA) 124 and 126 as well as the amplification provided by the one or more gain elements 104. The control electronics 118 can adaptively adjust the VOAs 124, 126 based on the readings from the first, second, third, and fourth detectors 114, 116, 128, 132 to maintain the input and output powers of the CW and CCW propagating light substantially constant. The round-trip transmission coefficient of the resonator can be controlled to a constant value that is close to, but less than one. In this way, losses of the optical components in the resonator can be compensated for to improve the performance of the gyroscope.

One or more pump lasers 120 can generate one or more pump beams to be provided to the one or more gain elements 104 to amplify the CW and CCW propagating light. In an example, the one or more pump lasers 120 comprise stable diode pump lasers. The amplification provided by the one or more gain elements 104 can be controlled by controlling the power of the one or more pump lasers 120. Accordingly, the control electronics 118 can control the one or more pump lasers 120 to control the amplification provided by the one or more gain elements 104.

The resonator can include one or more first variable optical attenuators (VOAs) 122 to attenuate the CW and CCW propagating light in the resonator. The one or more first VOAs 122 can be disposed in the path of the CW and CCW propagating light and can be controlled (e.g., adaptively adjusted) by the control electronics 118. The control electronics 118 can control the one or more first VOAs 122 in combination with the amplification provided by the one or more gain elements 104 to achieve a total round-trip transmission coefficient of the CW and CCW propagating light close to, but less than one. In some examples, the one or more first VOAs 122 can adjust the round-trip loss of the CW and CCW propagating light with a faster response time than the one or more gain elements 104; and can accordingly be used to attenuate, at a higher speed, the CW and/or CCW propagating light to maintain the round-trip transmission coefficient at less one. The one or more first VOAs 122 can be disposed at any suitable location within the paths of the CW and CCW propagating light in the resonator.

As mentioned above, the gain elements 104 are configured and the first VOA 122 is controlled such that the round-trip transmission coefficient is less than one. Maintaining the round-trip transmission coefficient at less than one ensures that the resonator does not act as a ring laser gyroscope (RLG). This is a fundamental difference between the example RFOGs with gain element described herein and a RLG. In other words, the example RFOGs with gain elements described herein still incur a round-trip loss (i.e., the round-trip loss is a positive value) in the resonator, and the gain elements 104 are used to reduce, but not eliminate, the round-trip loss.

In another example, the round-trip loss of the resonator can be precisely monitored by applying a transient loss or gain change to the resonator by adjusting the VOA 122 and/or the pump 120. Then, the transient responses from such transient loss or gain change can be monitored at the output detectors 114, 116. The transient change in the round-trip loss of the resonator causes a corresponding change in the transient response which can be sensed by the output detectors 114, 116. The information from these sensed changes in the transient response is fed back to the control electronics 118. The control electronics 118 can include data having previously established characteristic mapping between transient responses and resonator loss/gain. The control electronics 118 use this data along with the sensed transient response to precisely control the VOA 112 and/or the pump 120 to precisely control the round-trip loss of the resonator. In an implementation of this example, applying the transient loss or gain, sensing of the transient response therefrom, and controlling of the VOA 122 and/or the pump laser(s) 120 can be performed periodically.

In another example, the frequency of the input signals 104, 106 can be temporarily scanned to determine the resonance linewidth. Since resonator finesse is inversely proportional to the linewidth, this linewidth information is an indicator of resonator round-trip loss and can be sensed by the output detectors 114, 116. Using the information from the output detectors 114, 116, the control electronics 118 can precisely control the pump 120 and/or the VOA 112 to maintain substantially constant resonator finesse. In an implementation of this example, the frequency of the input signals can be periodically scanned to perform the above method.

In addition, the resonator includes one or more narrow band optical filters 105, such as a fiber Bragg gratings (FBG), that have low attenuation in the wavelength region of input beams 106, and 108, but high attenuation for other wavelength regions, including the wavelength of pump laser 120 and the amplified spontaneous emission band of the gain element 104. The optical filter effectively prevents the unwanted noise light from circulating in the resonator so that the noise at the detector can be minimized.

The one or more gain elements 104 can be disposed in any suitable location within the paths of the CW and CCW propagating light in the resonator. Example gain elements 104 include a fiber amplifier, shown in FIG. 2, an optical parametric amplifier shown in FIG. 3, and doped input/output coupling elements, shown in FIGS. 4 and 5. In some examples, the system 100 can include multiple types of gain elements 104 such including both a fiber amplifier and doped input/output coupling elements.

FIG. 2 is a diagram of an example fiber amplifier 200. The fiber amplifier 200 can be used as a gain element 104 in the system 100 of FIG. 1. In operation, a CW or CCW propagating light enters into a first port 202 of the fiber amplifier 200. The CW or CCW propagating light is coupled by a first wavelength division multiplexer (WDM) 204 into a main fiber 206. The CW or CCW propagating light propagates through the main fiber 206 and is coupled by a second WDM 208 to a second port 210. The CW or CCW propagating light exits the second port 110 and continues propagating through the resonator. While the CW or CCW propagating light propagates through the main fiber 206, a pump beam is inserted to propagate in the opposite direction as the CW or CCW propagating light (the light to be amplified) through the main fiber 206. The pump beam is inserted into a third port 212 and is coupled into the main fiber 206 by the second WDM 208. The pump beam propagates through the main fiber 206 in the opposite direction as the CW or CCW propagating light and is coupled out of the main fiber 206 to the fourth port 214 by the first WDM 204. The gain of the fiber amplifier 200 can be controlled by controlling the intensity of the pump beam. In an example, the fiber amplifier 200 can be doped with rare-earth ions and operated in a gain-saturated or gain-clamped mode to provide stable operation. In another example, the fiber amplifier 200 can use a non-linear optical mechanism, such as four wave mixing (FWM), stimulated Raman scattering (SRS), and stimulated Brillouin scattering (SBS), to amplify the signal. The fiber amplifier can be operated bi-directionally and has equal gain for both CW and CCW light. Additionally, the noise from the fiber amplifier 200, such as amplified spontaneous emission (ASE), can be minimized using narrow band optical filters so that it has little impact on performance.

FIGS. 3A and 3B are diagrams of example optical parametric amplifiers (OPAs) 301, 302 that can be used as gain elements 104 in the system 100 of FIG. 1. The OPAs 301, 302 are phase sensitive amplifiers that have low noise. The OPAs 301, 302 are disposed in the paths of the CW and CCW propagating light. The OPAs 301, 302 can use a non-collinear pumping scheme so that the strong pump lights do not propagate in the same direction as the signal lights, avoiding buildup of pump beams in the resonator. The first OPA 301 is composed of a non-linear optical birefringent crystal that is configured to use a first pump beam 304 to amplify the CW propagating light 303. The crystal axis, the frequency and orientation of the first pump beam 304 is selected such that the phase matching condition is satisfied. The first pump beam 304 is incident upon on the first OPA 301 at an angle that causes amplification of the CW propagating light 303 transmitting through the first OPA 301. When the first pump beam 304 strikes the first OPA 301, the CW propagating light 303 is amplified and another beam (the idler signal 306) is generated from the first OPA 301 as known to those skilled in the art. Similarly, the second OPA 302 is composed of a non-linear optical crystal that is configured to use a second pump beam 308 to amplify the CCW propagating light 307. The frequency and orientation of the second beam 308 is selected such that the phase matching condition is satisfied. The second pump beam 308 is incident upon on the second OPA 302 at an angle that causes amplification of the CCW propagating light 307 transmitting through the second OPA 302. When the second pump beam 308 strikes the second OPA 302, the CCW propagating light 307 is amplified and another beam (the idler signal 310) is generated from the second OPA 302 as known to those skilled in the art. In an example, the OPAs 301, 302 can be operated in saturation or be gain-clamped to provide stable operation.

Figure 4:
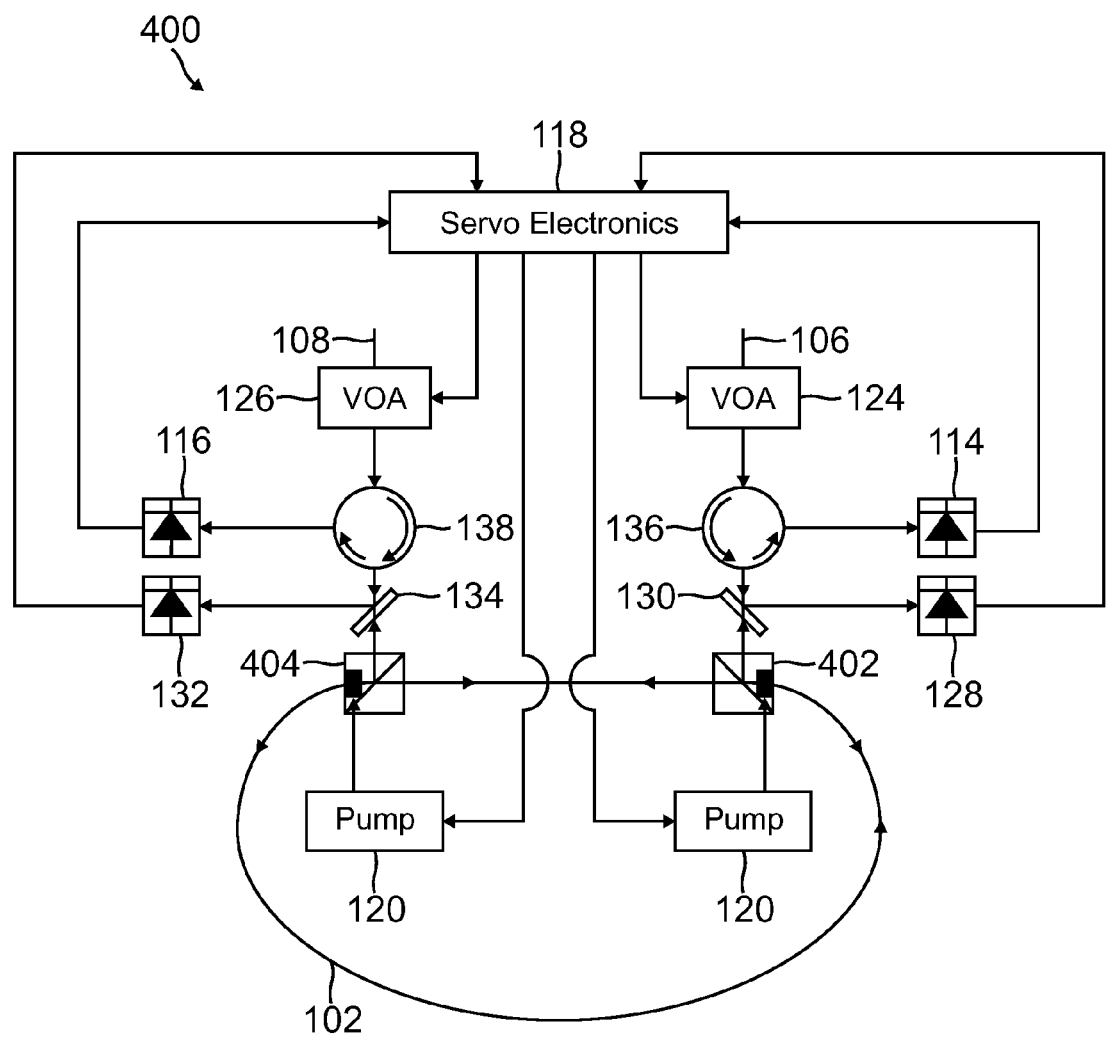
FIG. 4 is a block diagram of another example system including an optical fiber resonator having one or more gain elements therein for use in a gyroscope, wherein the input/output coupling elements function as gain elements.

FIG. 4 is a block diagram of another example system 400. System 400 includes an optical fiber resonator having one or more gain elements therein for use in a gyroscope, wherein the one or more gain elements are integrated with the input/output coupling elements 402, 404. In system 400, similarly number components perform similarly to those described with respect to system 100 of FIG. 1. System 400, however, is an example of input/output coupling elements 402, 404 that function as gain elements.

Similar to the input/output coupling elements 110, 112, the input/output coupling elements 402, 404 include partially reflective mirrors. In the example shown in FIG. 4, the first input/output coupling element 402 is configured to reflect at least a portion of the first input light 106 into a first end of the optical fiber 102 as clockwise (CW) propagating light. That is, the first input light 106 and the first input/output coupling element 404 are oriented such that at least a portion of the first input light 106 is incident upon a reflective surface of the first input/output coupler 402 and reflected off of the reflective surface into the first end of the optical fiber 102. Similarly, the second input/output coupling element 404 is configured to reflect at least a portion of the second input light 108 into a second end of the optical fiber 102 as counter-clockwise (CCW) propagating light. That is the second input light 108, and the second input/output coupling element 404 are oriented such that at least a portion of the second input light 108 is incident upon a reflective surface of the second input/output coupler 404 and is reflected off of the reflective surface into the second end of the optical fiber 102. In this way, the first input light 106 and the second input light 108 are sent into the resonator to propagate in opposite directions therethrough.

Similar to the example shown in FIG. 1, the optical fiber 102 is oriented with the first end facing and aligned with the second end, such that the CW propagating light exiting the second end of the optical fiber 102 can propagate in a straight line to re-enter the first end of the optical fiber 102. Similarly, the CCW propagating light exiting the first end can also propagate in a straight line to re-enter the second end of the optical fiber 102.

The first and second input/output coupling elements 402, 404 are disposed within the paths of the CW propagating light and the CCW propagating light between the first end and the second end of the optical fiber 102. The first input/output coupling element 402 is configured to transmit the CW propagating light that has exited the second end of the optical fiber 102, such that this CW propagating light can re-enter the first end of the optical fiber 102. Likewise, the second input/output coupling element 404 is configured to transmit the CCW propagating light that has exited the first end of the optical fiber 102 such that this CCW propagating light can re-enter the second end of the optical fiber 102. In this way, the CW propagating light and the CCW propagating light can circulate multiple times through the resonator.

The first and second input/output coupling elements 402, 404 are also configured to direct a portion of the light out of the resonator for sensing. The first input/output coupling element 402 is configured to reflect a portion of the CCW propagating light out of the resonator and the second input/output coupling element 404 is configured to reflect a portion of the CW propagating light out of the resonator. By selecting the reflectivity of the surfaces of the first and second input/output coupling elements 402, 404, a portion of the CW and the CCW propagating light can be reflected out of the resonator and other portions of the CW and CCW propagating light can be transmitted through the first and second input/output coupling elements 402, 404 to re-enter the optical fiber 102. The portion of the CW and CCW propagating light that exits the resonator is directed to a first and second detector 114, 116 respectively.

In addition to functioning as input/output coupling elements, gain elements are incorporated into the input/output coupling elements 402, 404. The gain elements are incorporated into the input/output coupling elements 402, 404 by forming a partially reflective mirror for the input/output coupling elements 402, 404 on rare-earth ion doped material with a dielectric coating. As such, pump beams can be directed onto the doped glass to amplify the CW and CCW propagating light in the resonator. In an example, the doped glass is composed of erbium doped glass with a dielectric coating. In an example, the power of the pump 120 and the doping level of doped glass are selected such that the gain elements incorporated with the input/output coupling elements 402, 404 operate in a gain saturation region, providing a stable control of the round-trip gain. Additionally, the amplified spontaneous emission (ASE) from the gain elements can be designed to have little impact on performance. The one or more pump lasers 120 can generate a first pump beam for the doped glass of the first input/output coupling element 402 and a second pump beam for the doped glass of the second input/output coupling element 404. In some examples, each pump 120 is individually controlled by the control electronics 118 to maintain a constant round-trip loss of the resonator.

Figure 5:
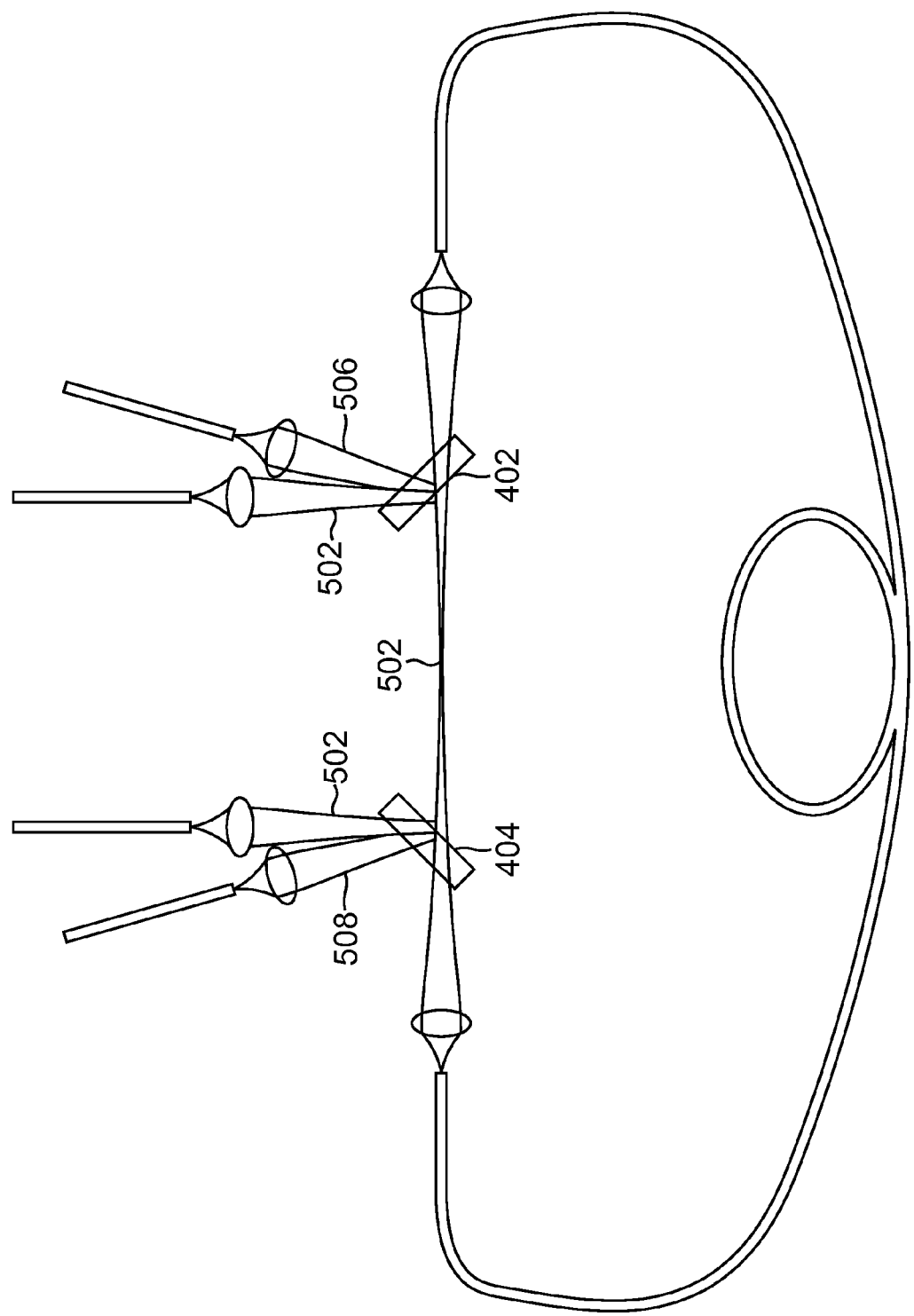
FIG. 5 is a diagram of an example of the input/output coupling elements and the resonator of the system of FIG. 4.

FIG. 5 is a diagram of an example of the input/output coupling elements 402, 404 with the integrated gain elements in the resonator. As shown, the signal light 502 (e.g., the first and second light 106, 108, and CW and CCW propagating light) are reflected into and out of the optical fiber 102 by reflecting off of the input/output coupling elements 402, 404 and resonated within the resonator by transmitting through the input/output coupling elements 402, 404. To amplify the CW propagating light in the resonator, a first pump beam 506 is provided by the one or more pump lasers 120 and is incident upon the reflective surface of the first input/output coupling element 402. The first pump beam 506 is oriented at an acute angle with respect to the input/output signal light 502 reflecting off of the reflective surface. The first and second pump beams 506, 508 cause amplification of the CW and CCW propagating signals that are transmitting through the first and second input/output coupling elements 402, 404. The orientation of the first and second pump beams 506, 508 are also selected such that both the first and second pump beams 506, 508 do not circulate within the resonator.

The input/output coupling elements 402, 404 and the first and second pump beams 506, 508 are configured such that lasing does not occur in the resonator. To ensure that lasing does not occur, the input/output coupling elements 402, 404 and the first and second pump beams 506, 508 are configured such that the round-trip gain of the CW and CCW propagating light through the resonator is less than one.

In an example, the amplification power provided by the input/output coupling elements 402, 404 is controlled by control electronics 118. The control (e.g., servo) electronics 118 receive signals from the first and second detectors 114, 116 as an indication of the CW and CCW propagating light. Based on these signals, the control electronics 118 control the amplification provided by the input/output coupling elements 402, 404. The amplification power provided by the input/output coupling elements 402, 404 can be controlled by controlling the power of the one or more pump lasers 120 to control the first and second pump beams 506, 508. The control electronics 118 can adaptively adjust the amplification provided by the one or more gain elements 104 based on the CW and CCW propagating light sensed by the first and second detectors 114, 116 to maintain the round-trip gain of the CW and CCW propagating light at a constant value that is less than one. In other words, the amplification of the input/output coupling elements 402, 404 can be controlled to provide a round-trip transmission coefficient that is close to, but less than 100%. In this way, losses of the optical components in the resonator can be compensated for to improve the gyroscope performance.

Integrating gain elements with the input/output coupling elements 402, 404 as described above can reduce the element count in the system 400 and can allow optimization of input/output coupling ratio for relaxed requirements for the power of the first and second input light 106, 108. The requirements for the power of the first light 106 and the second light 108 can be relaxed, because reduced power can be compensated for by the gain provided by the input/output coupling elements 402, 404. Large coupling coefficient of the input/output coupling elements 402, 404, can be used so that light can be more efficiently coupled into and out of the resonator. In an example, the coupling elements 402, 404 can have mirrors with high reflectivity so that most of the light can be coupled in and out of the resonator. The associated high transmission loss of these couplers 402, 404, due to the high reflection mirror, can be compensated by the gain element in the couplers 402, 404. In such a configuration, the power requirements of the input light 106, 108 can be significantly reduced.

Although not shown in FIG. 4, the system 400 can also include one or more VOAs 122 in the resonator to control the CW and CCW propagating light in combination with the amplification provided by the input/output coupling elements 402, 404 in ways similar to that described above with respect to FIG. 1. The system 400 can also include one or more narrow band optical filters similar to those described with respect to FIG. 1. Additionally, resonance tracking electronics are also be included as described with respect to system 100 of FIG. 1.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

Example Embodiments

Example 1 includes a resonator fiber optic gyroscope (RFOG) comprising: one or more light sources to produce a first light and a second light; an optical fiber resonator including: an optical fiber having a first end and a second end; a first input/output coupling element to couple at least a portion of the first light into the optical fiber as clockwise propagating light; a second input/output coupling element to couple the second light into the optical fiber as counter-clockwise propagating light; one or more optical filters that suppresses the noise light in the resonator; one or more variable optical attenuators (VOAs) that can adjust the loss of the resonator with fast response; and one or more optical gain elements that provide amplification of light to offset part of the losses of the resonator; a first detector configured to sense the portion of the counter-clockwise propagating light and provide a signal based thereon to resonance tracking electronics; a second detector configured to sense the portion of the clockwise propagating light and provide a signal based thereon to the resonance tracking electronics; the resonance tracking electronics configured to determine a rotation rate of the optical fiber resonator based on the signals from the first and second detector; one or more pump lasers to produce one or more pump beams for the gain elements in the resonator; control electronics configured to control the one or more pump lasers and the one or more variable optical attenuators, such that the round-trip loss of the resonator is a substantially constant, positive value.

Example 2 includes the RFOG of Example 1, wherein the gain elements are integrated with the first and second input/output coupling element.

Example 3 includes the RFOG of Example 2, wherein the first and second input/output coupling elements with the gain elements integrated therein include a partially reflective mirror on rare-earth doped material with a dielectric coating.

Example 4 includes the RFOG of any of Examples 1-3, wherein the gain elements are optical parametric amplifiers composed of nonlinear optic crystals.

Example 5 includes the RFOG of any of Examples 1-4, wherein the first input/output coupling element is configured to reflect the at least a portion of the first light into a first end of the optical fiber as the clockwise propagating light and to transmit the clockwise propagating light from a second end of the optical fiber such that the clockwise propagating light can re-enter the first end of the optical fiber; wherein the second input/output coupling element is configured to reflect at least a portion of the second light into the second end of the optical fiber as the counter-clockwise propagating light and to transmit the counter-clockwise propagating light from the first end of the optical fiber such that the counter-clockwise propagating light can re-enter the second end of the optical fiber.

Example 6 includes the RFOG of Example 5, wherein the first input/output coupling element is configured to reflect the portion of the counter-clockwise propagating light out of the optical fiber resonator; wherein the second input/output coupling element is configured to reflect the portion the clockwise propagating light out of the optical fiber resonator.

Example 7 includes the RFOG of any of Examples 1-6, wherein one or more of the optical filters are narrow band optical filters that have low attenuation at input laser wavelengths but substantially high attenuation at wavelengths of emissions from the gain elements and pump lasers.

Example 8 includes the RFOG of any of Examples 1-7, wherein the control electronics are configured to receive signals from the first and second detector based on the portions of the clockwise and counter-clockwise light sensed by the first and second detectors, the control electronics configured to control the power of the first and second pump beams based on the signals from the first and second detector to maintain the round-trip loss at a substantially constant, positive value that is less than 10%.

Example 9 includes the RFOG of any of Examples 1-8, comprising: a first beam splitter between the one or more light sources and the first input/output coupling element, the first beam splitter configured to transmit a first portion of the first light to the first input/output coupling element and to reflect a second portion of the first light to a third detector; the third detector coupled to the control electronics and configured to sense the second portion of the first light and to provide a signal proportional to the intensity of the first light to the control electronics; a second beam splitter between the one or more light sources and the second input/output coupling element, the second beam splitter configured to transmit a first portion of the second light to the second input/output coupling element and to reflect a second portion of the second light to a fourth detector; the fourth detector coupled to the control electronics and configured to sense the second portion of the second light and to provide a signal proportional to the intensity of the second light to the control electronics; a first variable optical attenuator in the path of the first light in the resonator and coupled to the control electronics; and a second variable optical attenuator in the path of the second light in the resonator and coupled to the control electronics; wherein the control electronics are configured to control the first and second variable optical attenuators based on the signals from the third and fourth detectors to reduce light intensity variation of the first light and the second light and such that the intensity of light from the first and second light source is substantially the same.

Example 10 includes the RFOG of Example 9, wherein the first beam splitter is configured to transmit the portion of the counter-clockwise propagating light from the first input/output coupling element therethrough and the second beam splitter is configured to transmit the portion of the clockwise propagating light from the second input/output coupling element therethrough; a first circulator to receive the first light from the one or more light sources and to provide the first light to the first beam splitter, the first circulator to receive the portion of the counter-clockwise propagating light from the first beam splitter and to provide the portion of the counter-clockwise propagating light to the first detector; and a second circulator to receive the second light from the one or more light sources and to provide the second light to the second beam splitter, the second circulator to receive the portion of the clockwise propagating light from the second beam splitter and to provide the portion of the clockwise propagating light to the second detector.

Example 11 includes the RFOG of any of Examples 1-10, wherein the control electronics are configured to control the one or more variable optical attenuators in the resonator in combination with the one or more pump beams to control the round-trip loss of the resonator.

Example 12 includes the RFOG of Example 11, wherein the control electronics are configured to: adjust the one or more variable optical attenuators in the resonator or the one or more pump lasers to apply a transient loss or gain change to the resonator; based on a transient response sensed by the first and second detectors with respect to the transient loss or gain change, control the one or more variable optical attenuators or the one or more pump lasers to maintain the round-trip loss at the substantially constant, positive value.

Example 13 includes the RFOG of any of Examples 11 or 12, wherein the control electronics are configured to: scan frequencies of the first light and second light; based on signals from the first detector and second detector obtain resonance linewidth information that is related to round-trip loss of the resonator to control the one or more variable optical attenuators or the one or more pump lasers to maintain the round-trip loss at the substantially constant positive value.

Example 14 includes RFOG of any of Examples 1-13, wherein the gain elements are configured to operate in one of the gain-saturated or gain-clamped modes to maintain the round-trip loss at the substantially constant positive value.

Example 15 includes the RFOG of any of Examples 1-14, wherein the optical fiber is a hollow core fiber.

Example 16 includes the fiber resonator gyroscope of any of Examples 1-15, wherein the one or more pump beams are aligned non-collinear with the clockwise and counter-clockwise propagating light to avoid strong pump light from circulating in the resonator.

Example 17 includes a method for controlling round-trip loss of light propagating through an optical fiber resonator in a gyroscope, the method comprising: sensing a first light to be propagated through the optical fiber resonator as clockwise propagating light; attenuating the first light to reduce intensity variation based on the sensing of the first light; sensing a second light to be propagated through the optical fiber resonator as counter-clockwise propagating light; attenuating the second light to reduce intensity variation based on the sensing of the second light; adjusting the intensity of the first and second light such that the first and second light are substantially the same; sensing the clockwise propagating light at a resonator output; amplifying the clockwise propagating light to provide a round-trip loss of less than 10% for the resonator; sensing the counter-clockwise propagating light at a resonator output; and amplifying the counter-clockwise propagating light to provide a round-trip loss of less than 10% for the resonator, wherein amplifying the clockwise propagating light and the counter-clockwise propagating light places the round-trip loss of the clockwise propagating light and the round-trip loss of the counter-clockwise propagating light substantially the same.

Example 18 includes the method of Example 17, comprising: attenuating the clockwise propagating light, wherein amplifying and attenuating the clockwise propagating light is controlled to provide the round-trip loss of less than 10%; and attenuating the counter-clockwise propagating light, wherein amplifying and attenuating the counter-clockwise propagating light is controlled to provide a round-trip loss of less than 10%.

Example 19 includes a method to control the round-trip loss of a resonator in a gyroscope, the method comprising: applying a transient loss or gain change to the resonator through a variable optical attenuator (VOA) or a gain element in the resonator; sensing response signals corresponding to the transient loss or gain change at an output detector for the resonator; processing the response signals to determine a round-trip loss/gain of the resonator based on previous established characteristic mapping between the transient response signal and the resonator loss/gain; and adjusting at least one of the VOA and the gain element in the resonator to control the round-trip loss of the resonator at less than 10%.

Example 20 includes the method of Example 19, comprising: scanning a frequency of at least one input laser for the resonator over a range larger than the resonance linewidth of the resonator; sensing second response signals corresponding to the scanning at an output detector for the resonator; processing the second response signals to determine a round-trip loss/gain of the resonator based on resonance linewidth information obtained in the second response signals; and adjusting at least one of the VOA or the gain element in the resonator to control the round-trip loss of the resonator to less than 10%.

What is claimed is:

1. A resonator fiber optic gyroscope (RFOG) comprising:
   an optical fiber resonator including:
       an optical fiber having a first end and a second end;
       a first input/output coupling element to couple at least a portion of a first light into the optical fiber as clockwise propagating light;
       a second input/output coupling element to couple at least a portion of a second light into the optical fiber as counter-clockwise propagating light;
       one or more optical filters that suppresses noise light in the resonator;
       one or more variable optical attenuators (VOAs) that can adjust the loss of the resonator; and
       one or more optical gain elements that provide amplification of light to offset part of the losses of the resonator;
   a first detector configured to sense a portion of the counter-clockwise propagating light and provide a signal based thereon to resonance tracking electronics;
   a second detector configured to sense a portion of the clockwise propagating light and provide a signal based thereon to the resonance tracking electronics;
   the resonance tracking electronics configured to determine a rotation rate of the optical fiber resonator based on the signals from the first and second detector;
   one or more pump lasers to produce one or more pump beams for the one or more optical gain elements in the resonator;
   control electronics configured to control the one or more pump lasers and the one or more variable optical attenuators, such that the round-trip loss of the resonator is a substantially constant, positive value.

2. The RFOG of claim 1, wherein the one or more optical gain elements are integrated with the first and second input/output coupling element.

3. The RFOG of claim 2, wherein the first and second input/output coupling elements with the one or more optical gain elements integrated therein include a partially reflective mirror on rare-earth doped material with a dielectric coating.

4. The RFOG of claim 1, wherein the one or more optical gain elements are optical parametric amplifiers composed of nonlinear optic crystals.

5. The RFOG of claim 1, wherein the first input/output coupling element is configured to reflect the at least a portion of the first light into a first end of the optical fiber as the clockwise propagating light and to transmit the clockwise propagating light from a second end of the optical fiber therethrough such that the clockwise propagating light can re-enter the first end of the optical fiber;
   wherein the second input/output coupling element is configured to reflect the at least a portion of the second light into the second end of the optical fiber as the counter-clockwise propagating light and to transmit the counter-clockwise propagating light from the first end of the optical fiber therethrough such that the counter-clockwise propagating light can re-enter the second end of the optical fiber.

6. The RFOG of claim 5, wherein the first input/output coupling element is configured to reflect the portion of the counter-clockwise propagating light out of the optical fiber resonator;
   wherein the second input/output coupling element is configured to reflect the portion of the clockwise propagating light out of the optical fiber resonator.

7. The RFOG of claim 1, wherein the one or more optical filters are one or more narrow band optical filters that have low attenuation at input laser wavelengths but substantially high attenuation at wavelengths of emissions from the one or more optical gain elements and one or more pump lasers.

8. The RFOG of claim 1, wherein the control electronics are configured to receive signals from the first and second detector based on the portions of the clockwise and counter-clockwise light sensed by the first and second detectors, the control electronics configured to control the power of the one or more pump beams based on the signals from the first and second detector to maintain the round-trip loss at a substantially constant, positive value that is less than 10%.

9. The RFOG of claim 1, comprising:
a first beam splitter configured to transmit a first portion of the first light to the first input/output coupling element and to reflect a second portion of the first light to a third detector;
the third detector coupled to the control electronics and configured to sense the second portion of the first light and to provide a signal proportional to the intensity of the first light to the control electronics;
a second beam splitter configured to transmit a first portion of the second light to the second input/output coupling element and to reflect a second portion of the second light to a fourth detector;
the fourth detector coupled to the control electronics and configured to sense the second portion of the second light and to provide a signal proportional to the intensity of the second light to the control electronics;
a first variable optical attenuator in the path of the first light to the resonator and coupled to the control electronics; and
a second variable optical attenuator in the path of the second light to the resonator and coupled to the control electronics;
wherein the control electronics are configured to control the first and second variable optical attenuators based on the signals from the third and fourth detectors to reduce light intensity variation of the first light and the second light and such that the intensity of light from the first and second light source is substantially the same.

10. The RFOG of claim 9, wherein the first beam splitter is configured to transmit the portion of the counter-clockwise propagating light from the first input/output coupling element therethrough and the second beam splitter is configured to transmit the portion of the clockwise propagating light from the second input/output coupling element therethrough;
a first circulator to receive the first light and to provide the first light to the first beam splitter, the first circulator to receive the portion of the counter-clockwise propagating light from the first beam splitter and to provide the portion of the counter-clockwise propagating light to the first detector; and
a second circulator to receive the second light and to provide the second light to the second beam splitter, the second circulator to receive the portion of the clockwise propagating light from the second beam splitter and to provide the portion of the clockwise propagating light to the second detector.

11. The RFOG of claim 1, wherein the control electronics are configured to control the one or more variable optical attenuators in the resonator in combination with the one or more pump beams to control the round-trip loss of the resonator.

12. The RFOG of claim 11, wherein the control electronics are configured to:
adjust the one or more variable optical attenuators in the resonator or the one or more pump lasers to apply a transient loss or gain change to the resonator;
based on a transient response sensed by the first and second detectors with respect to the transient loss or gain change, control the one or more variable optical attenuators or the one or more pump lasers to maintain the round-trip loss at the substantially constant, positive value.

13. The RFOG of claim 11, wherein the control electronics are configured to:
scan frequencies of the first light and second light;
based on signals from the first detector and second detector obtain resonance linewidth information that is related to round-trip loss of the resonator to control the one or more variable optical attenuators or the one or more pump lasers to maintain the round-trip loss at the substantially constant, positive value.

14. The RFOG of claim 1, wherein the one or more optical gain elements are configured to operate in one of a gain saturated or gain-clamped modes to maintain the round-trip loss at the substantially constant positive value.

15. The RFOG of claim 1, wherein the optical fiber in the resonator is a hollow core fiber.

16. The RFOG of claim 1, wherein the one or more pump beams are aligned non-collinear with the clockwise and counter-clockwise propagating light to avoid strong pump light from circulating in the resonator.

* * * * *